(12) United States Patent
Lee

(10) Patent No.: US 11,408,455 B2
(45) Date of Patent: Aug. 9, 2022

(54) SYSTEMS AND METHODS FOR FRICTION BIT JOINING

(71) Applicant: Lee Machine, Inc., Roy, UT (US)

(72) Inventor: Stephen Lee, Roy, UT (US)

(73) Assignee: Lee Machine, Inc., Roy, UT (US)

( * ) Notice: Subject to any disclaimer, the term of this patent is extended or adjusted under 35 U.S.C. 154(b) by 258 days.

(21) Appl. No.: 16/684,539

(22) Filed: Nov. 14, 2019

(65) Prior Publication Data

US 2020/0158151 A1    May 21, 2020

Related U.S. Application Data

(60) Provisional application No. 62/768,056, filed on Nov. 15, 2018.

(51) Int. Cl.
*B23K 20/12*      (2006.01)
*F16B 5/08*       (2006.01)

(52) U.S. Cl.
CPC .............. *F16B 5/08* (2013.01); *B23K 20/125* (2013.01); *B23K 20/1255* (2013.01)

(58) Field of Classification Search
CPC .................... B23K 20/1245; B23K 20/125; B23K 20/129; B23K 20/1295
See application file for complete search history.

(56) References Cited

U.S. PATENT DOCUMENTS

| | | | | |
|---|---|---|---|---|
| 3,640,147 A | * | 2/1972 | Fantoni | B23G 1/16 74/89.36 |
| 4,122,990 A | * | 10/1978 | Tasaki | B23K 20/1285 228/2.3 |
| 4,362,444 A | * | 12/1982 | Watkins | B23Q 16/003 408/10 |
| RE31,627 E | * | 7/1984 | Evans | B23Q 1/70 173/146 |
| 4,546,834 A | * | 10/1985 | Menzel | B23Q 5/326 173/146 |
| 5,090,489 A | * | 2/1992 | Ettori | B23Q 1/4828 173/165 |
| 5,094,118 A | * | 3/1992 | Morita | B25J 9/102 74/424.9 |
| 5,100,271 A | * | 3/1992 | Kameyama | B23Q 5/326 409/231 |
| 5,888,033 A | * | 3/1999 | Zagar | B23Q 1/70 408/14 |

(Continued)

OTHER PUBLICATIONS

Siemssen, Brandon Raymond, "Development and Characterization of Friction Bit Joining: A New Solid State Spot Joining Technology Applied to Dissimilar Al/Steel Joints" (2008). BYU ScholarsAchive Citation, All Theses and Dissertations. 1438.

*Primary Examiner* — Erin B Saad
*Assistant Examiner* — Carlos J Gamino
(74) *Attorney, Agent, or Firm* — FisherBroyles, LLP

(57) ABSTRACT

The disclosed friction bit joining systems may include a ball screw having an internal bore, a chuck and spindle configured to be rotated by a chuck spindle motor, a friction bit joining bit held by the chuck, a support frame, and a chuck driver motor positioned and configure to rotate the ball screw to axially move the chuck and the friction bit joining bit relative to the support frame. At least a portion of the spindle may be positioned within the internal bore of the ball screw. Various other related systems and methods are also disclosed.

19 Claims, 8 Drawing Sheets

(56) References Cited

U.S. PATENT DOCUMENTS

| | | | |
|---|---|---|---|
| 6,832,713 B2 | 12/2004 | Kano et al. | |
| 7,547,169 B1 * | 6/2009 | Zagar | B23B 31/263 |
| | | | 33/639 |
| 7,748,593 B2 * | 7/2010 | Sayama | B23K 20/126 |
| | | | 228/2.1 |
| 10,010,928 B2 * | 7/2018 | Zinn | B23K 20/1265 |
| 10,449,647 B2 * | 10/2019 | Merlini, III | B23Q 11/103 |
| 2001/0045447 A1 * | 11/2001 | Kano | B23K 20/1265 |
| | | | 228/112.1 |
| 2003/0029903 A1 | 2/2003 | Kashiki et al. | |
| 2004/0079787 A1 * | 4/2004 | Okamoto | B23K 20/126 |
| | | | 228/112.1 |
| 2004/0195290 A1 * | 10/2004 | Nagao | B23K 20/1245 |
| | | | 228/2.1 |
| 2005/0029331 A1 * | 2/2005 | Kano | B23K 20/123 |
| | | | 228/112.1 |
| 2005/0189398 A1 * | 9/2005 | Sato | B23K 20/125 |
| | | | 228/2.1 |
| 2007/0101787 A1 * | 5/2007 | Fujiuchi | B23K 9/013 |
| | | | 72/71 |
| 2007/0164086 A1 * | 7/2007 | Hochhalter | B23K 20/1235 |
| | | | 228/112.1 |
| 2009/0159639 A1 * | 6/2009 | Fukuhara | B23K 20/1265 |
| | | | 228/2.1 |
| 2012/0087756 A1 * | 4/2012 | Kanematsu | B23C 5/265 |
| | | | 409/80 |

* cited by examiner

SYSTEMS AND METHODS FOR FRICTION BIT JOINING

CROSS-REFERENCE TO RELATED APPLICATION

This application claims the benefit of U.S. Provisional Application No. 62/768,056, filed 15 Nov. 2018, the entire disclosure of which is incorporated herein by this reference.

BACKGROUND

Friction bit joining is a manufacturing technique for joining two workpieces together. The two (e.g., metal) workpieces are positioned to overlap each other and a rotating pin or bit is plunged into the overlapping the workpieces. The bit is consumed in the process (e.g., embedded in the workpieces) and forms a spot-welded joint between the workpieces, with the weld being formed of material from each of the workpieces and the consumed bit. Frictional heat is generated between the bit and the workpieces, which may facilitate plasticizing or melting of the material to be joined. In some cases, the material to be joined is softened by the frictional heat, but not melted. Thus, friction bit joining may be a solid-state joining process, depending on material properties and other parameters.

Friction bit joining may, in some instances, produce a stronger weld than other spot-welding techniques. For example, some conventional techniques employ combustion products, which can introduce undesirable chemical changes in certain workpieces. Also, the heat produced by friction bit joining is less than by some other conventional spot-welding techniques, which may reduce oxidation and other heat-induced problems that may weaken the joint or material adjacent to the joint. Thus, friction bit joining is sometimes used to join materials that are difficult to spot weld using other conventional techniques, such as certain metals, metal alloys (e.g., aluminum alloys, titanium alloys, nickel alloys, high strength steels, etc.), and other materials. Friction bit joining may be more effective than other conventional techniques in joining dissimilar metals and alloys to each other, such as steel to aluminum.

SUMMARY

In some embodiments, the present disclosure includes friction bit joining systems that may include a ball screw having an internal bore through the ball screw and external threads. A chuck and spindle may be configured to be rotated by a chuck driver spindle, wherein at least a portion of the spindle may be positioned within the internal bore of the ball screw. The chuck may be in a fixed axial position relative to the ball screw, and the chuck may be rotatable relative to the ball screw. A friction bit joining bit may be held by the chuck. A support frame may support the ball screw, the chuck, the spindle, and the friction bit joining bit. A chuck driver motor may be positioned and configured to rotate the ball screw to axially move the chuck and the friction bit joining bit relative to the support frame.

In some examples, the support frame may have a C-shaped configuration. A first end region may support the ball screw, the chuck, the spindle, and the friction bit joining bit. A second end region may provide a stop against which workpieces are held when the workpieces are being joined to each other with the friction bit joining bit. An intermediate region may extend from the first end region to the second end region. In some examples, at least the second end region and the intermediate region may comprise an integral, unitary material. At least one guiderail may be slidably coupled to the support frame. A motor support element may be rigidly coupled to a first end portion of the at least one guiderail. A bit support element may be rigidly coupled to a second, opposite end portion of the at least one guiderail. The at least one guiderail may include four guiderails positioned substantially symmetrically about the ball screw. The at least one slideway may be rigidly coupled to the support frame and may slidably couple the corresponding at least one guiderail to the support frame. The chuck spindle motor and/or the chuck driver motor may be supported by the motor support element.

In some examples, the support frame may include a ball screw holder having internal threads complementary to the external threads of the ball screw. Ball bearings may be positioned between the external threads of the ball screw and the internal threads of the ball screw holder. The chuck may be rotatably coupled to the ball screw via at least one chuck support bearing. The at least one chuck support bearing may include a first chuck support bearing at a first end portion of the ball screw and a second chuck support bearing at a second, opposite end portion of the ball screw. The chuck spindle motor may be mounted to the support frame and an output shaft of the chuck spindle motor may be operably coupled to the spindle via a spindle belt. The chuck driver motor may be mounted to the support frame and an output shaft of the chuck driver motor may be operably coupled to the ball screw via a chuck driver belt.

In some embodiments, the present disclosure includes methods of fabricating a friction bit joining system. In accordance with such methods, a chuck driver motor may be operably coupled to a ball screw such that the drive motor is configured to rotate the ball screw upon activation of the chuck driver motor. The chuck driver motor may be mounted on a motor support element. At least a portion of a spindle for holding a friction bit joining bit may be positioned within an internal bore of the ball screw. The spindle may be rotatably coupled and axially fixed relative to the ball screw. External threads of the ball screw may be mated with internal threads of a ball screw holder. The ball screw, spindle, and friction bit joining bit may be slidably coupled to the support frame.

In some examples, the methods may also include positioning ball bearings between the external threads of the ball screw and the internal threads of the ball screw holder. At least one guiderail may be rigidly coupled to the chuck driver motor, and the at least one guiderail may be slidably coupled to the support frame. For example, four guiderails may be slidably coupled to the support frame, and the four guiderails may be positioned substantially symmetrically about the spindle. A chuck spindle motor may be operably coupled to the spindle to rotate the spindle upon activation of the chuck spindle motor. The chuck spindle motor may be mounted on the motor support element.

In some embodiments, the present disclosure includes methods of joining two workpieces to each other. In accordance with such methods, a chuck may be rotated with a chuck spindle motor to rotate a friction bit joining bit held by the chuck. At least a portion of a spindle coupled to the chuck may be positioned within an internal bore of the ball screw. The chuck may be in a fixed axial position relative to the ball screw, and the chuck may be rotatable relative to the ball screw. The chuck and the friction stir bit joining bit may be driven toward overlapping workpieces to be joined to each other by rotating the ball screw with a chuck driver motor. The rotating friction bit joining bit may be further driven into at least one of the overlapping workpieces to join the workpieces to each other by further rotating the ball screw with the chuck driver motor.

In some examples, rotating the ball screw with the chuck driver motor may include translating rotation of an output of the chuck driver motor to the ball screw with a belt.

DETAILED DESCRIPTION

The present disclosure provides detailed descriptions of systems and methods for friction bit joining. The disclosed systems may include a chuck for holding a friction bit joining bit that is positioned within an internal bore of a ball screw. The chuck may be rotatable relative to the ball screw, but axially fixed relative to the ball screw, such that rotation of the ball screw may induce axial movement of the chuck and the friction bit joining bit. The systems and methods of the present disclosure may be suitable for a variety of friction bit joining techniques and applications and may substantially reduce the cost of friction bit joining systems compared to conventional standalone friction bit joining systems.

Figure 7:
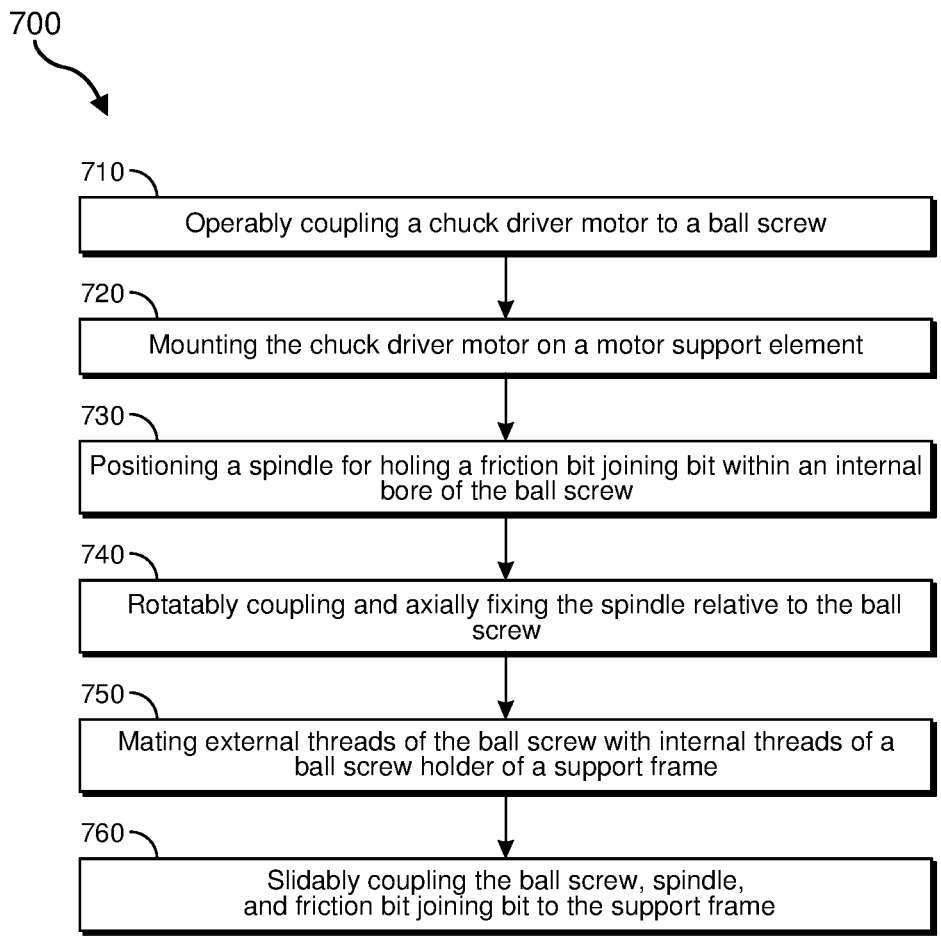
FIG. 7 is a flow diagram illustrating a method of fabricating a friction bit joining system, according to at least one embodiment of the present disclosure.
Figure 8:
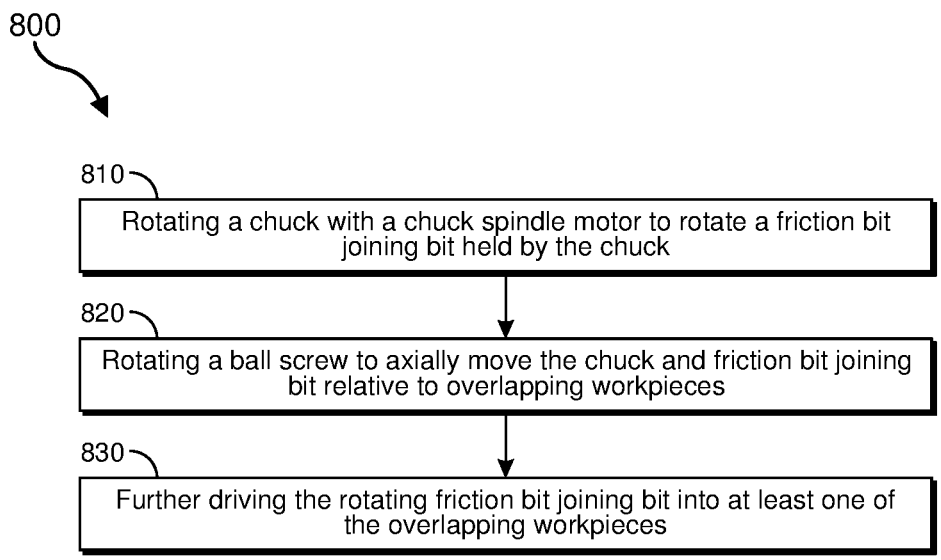
FIG. 8 is a flow diagram illustrating a method of joining two workpieces to each other, according to at least one embodiment of the present disclosure.

The following will provide, with reference to FIGS. 1-6B, detailed descriptions of an example friction bit joining systems. With reference to FIGS. 7 and 8, the following will provide detailed descriptions of example methods of fabricating friction bit joining systems and of joining two workpieces to each other, respectively.

Figure 1:
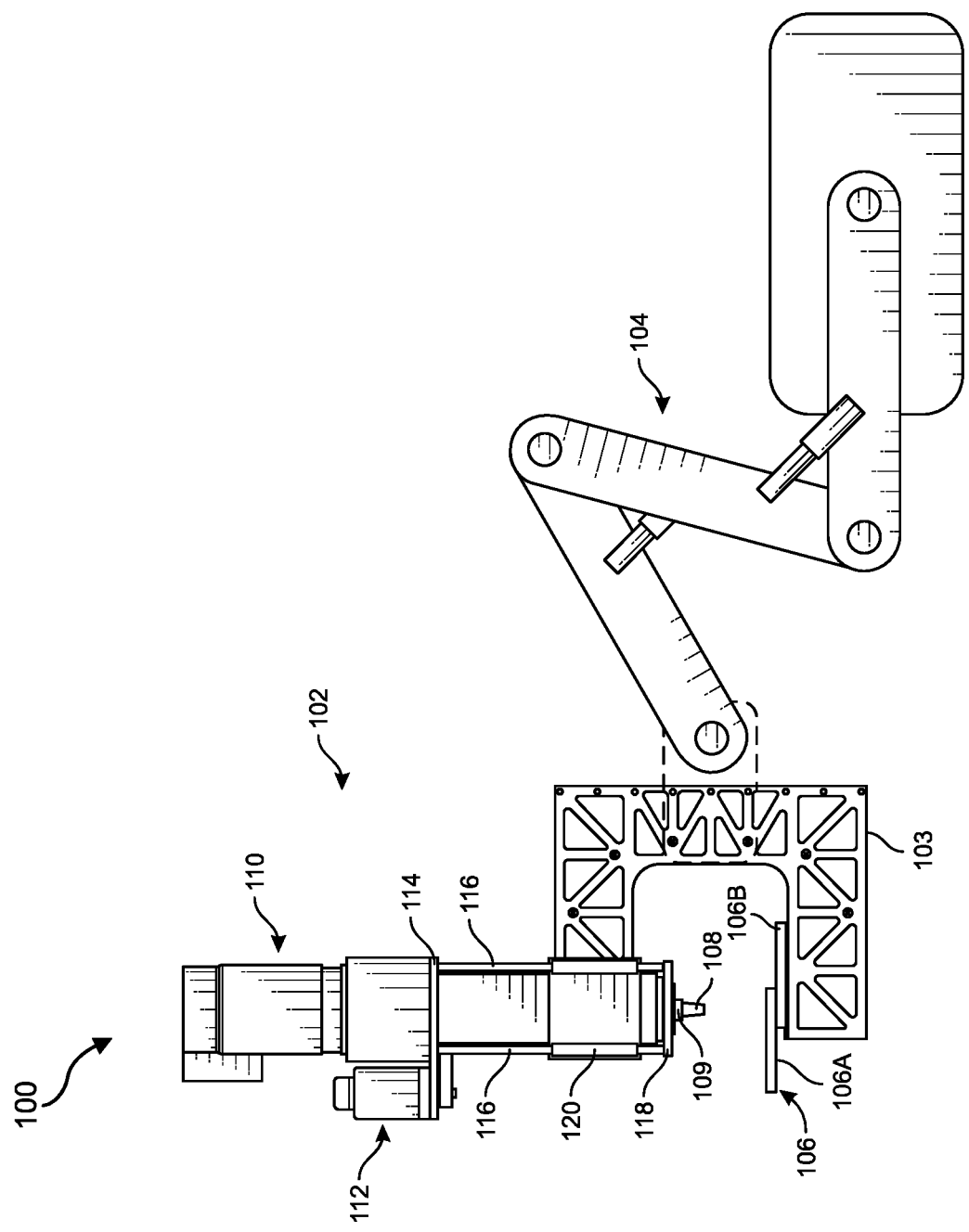
FIG. 1 is a side view of a friction bit joining system, according to at least one embodiment of the present disclosure.

FIG. 1 is a schematic cross-sectional side view of a friction bit joining ("FBJ") system 100, according to at least one embodiment of the present disclosure. The FBJ system 100 may include an FBJ assembly 102 supported by, for example, a robotic arm 104. The FBJ assembly 102 may include a support frame 103 that is coupled to a movable end of the robotic arm 104. The robotic arm 104 may be configured to position the FBJ assembly 102 in a location and orientation (e.g., angle) for joining workpieces 106 to each other with an FBJ bit 108 of the FBJ assembly 102. The workpieces 106 may include, for example, a first workpiece 106A and a second workpiece 106B overlapping each other. In some examples, the first workpiece 106A and the second workpiece 106B may each be the same or similar metal material (e.g., both steel), or the first workpiece 106A may be a first metal material (e.g., aluminum) and the second workpiece 106B may be a second, different metal material (e.g., steel).

FIG. 1 illustrates the FBJ assembly 102 supported by the robotic arm 104. However, the present disclosure is not so limited. In additional embodiments, the robotic arm 104 may be omitted and replaced by another support structure coupled to the support frame 103. The support structure may be stationary or movable.

The FBJ assembly 102 may include a chuck 109 for holding the FBJ bit 108. A chuck spindle motor 110 may be operably coupled to the chuck 109 to induce rotation of the chuck 109 and of the FBJ bit 108 upon activation of the chuck spindle motor 110. For example, the chuck 109 may be coupled to the chuck spindle motor 110 via a spindle 111 (FIG. 2) that may extend from the chuck spindle motor 110 to the chuck 109. A chuck driver motor 112 may be configured to axially (i.e., along an axis of rotation of the chuck 109) drive the chuck 109 and, consequently, the FBJ bit 108 relative to the workpieces 106 and the support frame 103. In some embodiments, the chuck spindle motor 110 and the chuck driver motor 112 may be physically supported by a motor support element 114. Rotation of the chuck spindle motor 110, rotation of the chuck driver motor 112, and movement of the robotic arm 104 (if present) may be controlled by a computer numerical control ("CNC") system. In some embodiments, the FBJ system 100 may be part of an assembly line, such as an automotive assembly line, to join workpieces 106 as they are positioned at or near the FBJ system 100.

The FBJ bit 108, chuck 109, chuck spindle motor 110, spindle 111, chuck driver motor 112, and motor support element 114 may be slidably coupled to the support frame 103, such as with at least one guiderail 116. In the embodiment shown in FIG. 1, for example, four guiderails 116 may be positioned substantially symmetrically about the chuck 109. The motor support element 114 may be rigidly coupled to a first (e.g., upper) end portion of the guiderails 116. A second (e.g., lower), opposite end portion of the guiderails 116 may be rigidly coupled to a bit support element 118. The guiderails 116 may be slidably coupled to the support frame 103 via respective slideways 120, which may be rigidly coupled to the support frame 103. As will be further explained below, activation of the chuck driver motor 112 may axially move the FBJ bit 108, chuck 109, chuck spindle motor 110, chuck driver motor 112, motor support element 114, guiderails 116, and bit support element 118 along the slideways 120 and relative to the support frame 103 and workpieces 106. These movable elements may be axially moved toward the workpieces 106 while the FBJ bit 108 and chuck 109 are rotated (e.g., via activation of the chuck spindle motor 110) to perform an FBJ operation to join the workpieces 106 to each other.

In some examples, the term "substantially" in reference to a given parameter, property, or condition, may refer to a degree that one skilled in the art would understand that the given parameter, property, or condition is met with a small degree of variance, such as within acceptable manufacturing tolerances. For example, a parameter that is substantially met may be at least about 90% met, at least about 95% met, or at least about 99% met.

In some examples, relational terms, such as "first," "second," "upper," "lower," etc., may be used for clarity and convenience in understanding the disclosure and accompanying drawings and do not connote or depend on any specific preference, orientation, or order, except where the context clearly indicates otherwise.

Figure 2:
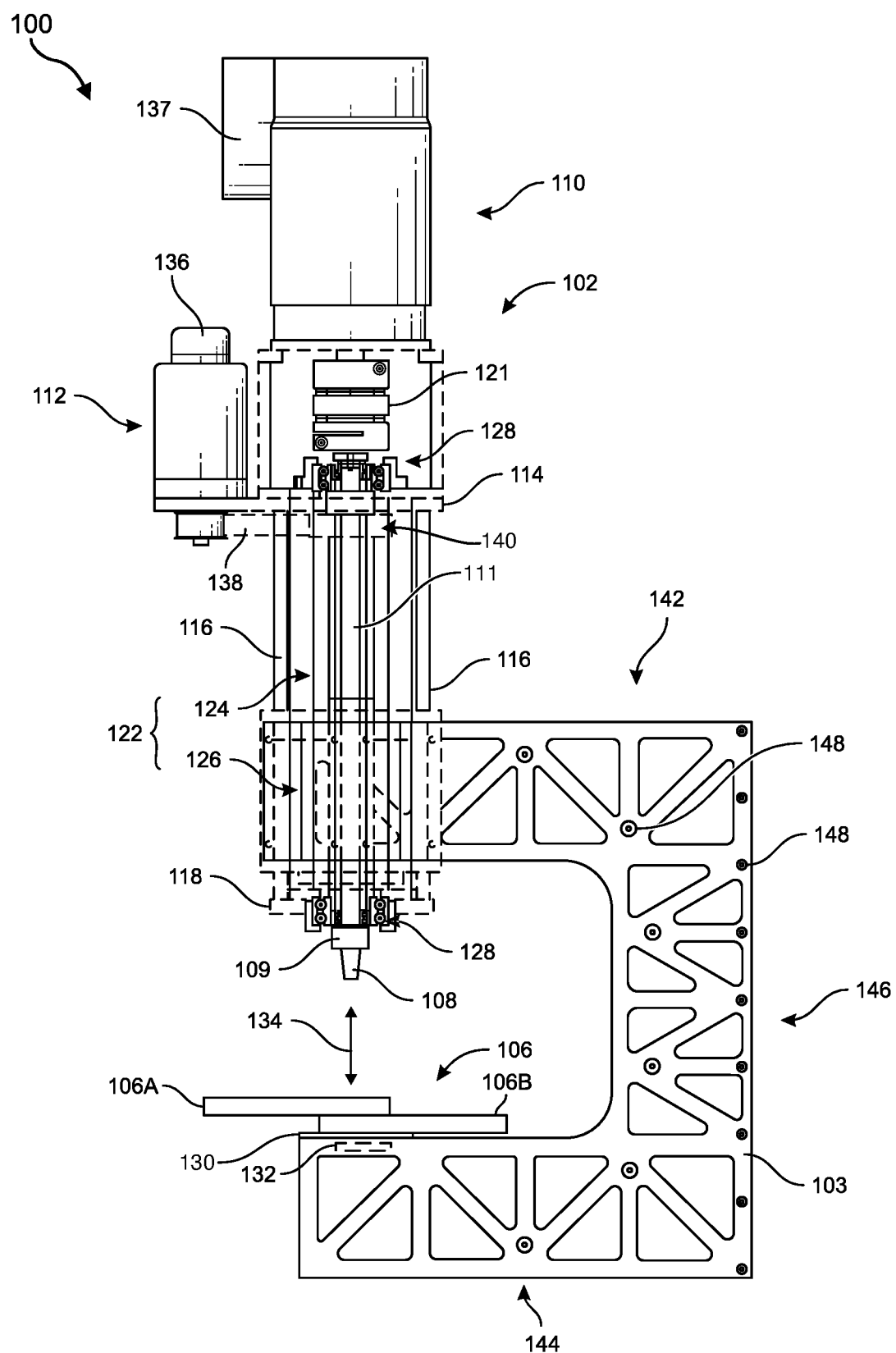
FIG. 2 is a partially cut-away side view of a portion of a friction bit joining assembly of the friction bit joining system of FIG. 1, according to at least one embodiment of the present disclosure.

FIG. 2 is a partially cut-away side view of the FBJ assembly 102, with certain elements removed or transparent to illustrate internal features of the FBJ assembly 102. As discussed above, the FBJ assembly 102 may include the support frame 103, the FBJ bit 108 held by the chuck 109, the chuck spindle motor 110 for inducing rotation in the FBJ bit 108 and chuck 109, and the chuck driver motor 112 for axially moving the FBJ bit 108 and chuck 109 toward and away from the workpieces 106. The chuck spindle motor 110 and the chuck driver motor 112 may be supported by the motor support element 114. The guiderails 116 may extend between the motor support element 114 and the bit support element 118 and may be slidably coupled to the support frame 103.

As shown in FIG. 2, an output of the chuck spindle motor 110 may be engaged with the spindle 111, such as with a coupler 121. In some embodiments, the output of the chuck spindle motor 110 may be substantially collinear with the spindle 111 and chuck 109. The spindle 111 may extend downward (from the perspective of FIG. 2) through a ball screw assembly 122. The ball screw assembly 122 may include a ball screw 124 and a ball screw holder 126. The ball screw 124 may include external threads and an internal bore within which at least a portion (e.g., a portion of the stem) of the chuck 109 may be positioned. Thus, the FBJ bit 108 and the chuck 109 may have an axis of rotation that is substantially collinear with an axis of rotation of the ball screw 124. By aligning the FBJ bit 108 with the ball screw 124, lateral torque on the FBJ bit 108 may be reduced or eliminated when the FBJ bit 108 is driven axially against and into the workpieces 106 for a joining operation.

The ball screw holder 126 may include internal threads and may be a part of, or may be rigidly coupled to, the support frame 103. The ball screw assembly 122 may also include ball bearings positioned between the external threads of the ball screw 124 and the internal threads of the ball screw holder 126. At least one chuck support bearing 128 may fix the chuck 109 in an axial position relative to the ball screw 124, while allowing the chuck 109 to rotate within the ball screw 124. For example, as shown in FIG. 2, the at least one chuck support bearing 128 may include a first chuck support bearing 128 at a first (e.g., upper) end portion of the ball screw 124 and a second chuck support bearing 128 at a second, opposite (e.g., lower) end portion of the ball screw 124. The chuck support bearing(s) 128 may include, for example, ball bearings positioned between an external surface of the chuck 109 and an internal surface of the ball screw 124.

The FBJ bit 108 may be securely held by the chuck 109, such as by positioning and securing a stem of the FBJ bit 108 within a cavity in the chuck 109. The FBJ bit 108 may be configured to be plunged into the first workpiece 106A and/or the second workpiece 106B of the workpieces 106, to weld and join the first and second workpieces 106A, 106B to each other. As explained above, the FBJ bit 108 may be configured to commingle ("stir") material from the first workpiece 106A with material from the second workpiece 106B. At least a portion of the FBJ bit 108 may also be configured to be broken or otherwise degraded off to remain in the workpieces 106 to form a spot weld between the workpieces.

The support structure 103 may include a table 130 that may provide a stop against which the workpieces 106 may be held when being joined to each other with the FBJ bit 108. In some embodiments, one or more sensors 132 may be provided, such as in, under, or on the table 130, to provide feedback to the FBJ system 100 in substantially real time. The sensor(s) 132 may be configured to sense at least one operating condition of the FBJ bit 108. For example, the sensor(s) 132 may include one or more load sensors (e.g., for sensing torque, pressure, and/or linear force applied by the FBJ bit 108 to the workpieces 106), temperature sensors (e.g., for sensing a temperature of the FBJ bit 108 and/or workpieces 106), and/or position sensors (e.g., for sensing an axial position of the FBJ bit 108 relative to the workpieces 106 and/or table 130). In some examples, a probe or other component of the sensor(s) 132 may be positioned in or proximate to the FBJ bit 108 and/or the chuck spindle motor 110. The feedback from the sensor(s) 132 may be used by the chuck driver motor 112 in substantially real time to adjust an axial position of the chuck 109 and FBJ bit 108, as may be desired to achieve proper and/or improved joining of the workpieces 106.

The chuck driver motor 112 may be configured to cause the FBJ bit 108 and other supporting components to move axially (i.e., in the direction 134 shown in FIG. 1) relative to the workpieces 106 and table 130, such as to perform an FBJ operation and/or in response to data from the sensor(s) 132. The chuck driver motor 112 may be any motor capable of controlled rotation, such as an electromagnetic stepper motor. An electrical power source and motor control system 136 may be used to control rotation of the chuck driver motor 112. The motor control system 136 may be in communication with the sensor(s) 132, the robotic arm 104 (FIG. 1), and/or with a chuck spindle motor control system 137 that controls the chuck spindle motor 110. The motor control system 136 may be part of a CNC system.

In some embodiments, a chuck driver belt 138 may be operably connected to the output of the chuck driver motor 112. The output of the chuck driver motor 112 may be or include a substantially cylindrical element that is configured to drive the chuck driver belt 138 upon rotation of the chuck driver motor 112. For example, the output may be a toothed gear or a substantially smooth cylinder. The chuck driver belt 138 may be a flexible member positioned and configured translate the rotation from the chuck driver motor 112 to the ball screw 124. For example, a drive gear 140 may be coupled to the ball screw 124 and engaged with the chuck driver belt 138. In some examples, the internal surface of the chuck driver belt 138 may include teeth to interface with the output of the chuck driver motor 112 and/or with the drive gear 140. When the chuck driver motor 112 rotates, the chuck driver belt 138 may translate the rotation to the drive gear 140 and ultimately to the ball screw 124. Rotation of the ball screw 124 relative to the ball screw holder 126 may induce axial movement of the ball screw 124. The interface between the chuck 109 and the ball screw 124 at the chuck support bearings 128 may cause the chuck 109 to also move in the axial direction 134 along with the ball screw 124.

As shown in FIG. 2, in some embodiments the support frame 103 may have a generally C-shaped configuration. Thus, the support frame 103 may include a first end (e.g., upper) region 142 supporting the ball screw assembly 122, the chuck 109, and the FBJ bit 108 (as well as other supporting components). A second end (e.g., lower) region 144 of the support frame 103 may include the table 130 to provide a stop against which the workpieces 106 may be held or positioned when the workpieces 106 are being joined to each other with the FBJ bit 108. An intermediate region 146 of the support frame 103 may extend from the first end region 142 to the second end region 144. As shown in FIG. 1 by way of example and not limitation, the support frame 103 may be mounted on the robotic arm 104 at the intermediate region 146.

The FBJ process may involve driving the FBJ bit 108 against and into the workpieces 106 with a high force, such as about 8,000-10,000 pounds-force (about 35,585-44,482 N) for some joining processes. Accordingly, the support frame 103 may be designed to have a sufficient strength to withstand such forces, which may be applied between inner surfaces of the first end region 142 and the second end region 144. In some examples, the support frame 103 may include a truss construction formed of one or more pieces of sheet metal, such as half-inch to one-inch (about 1.27 cm to 2.54 cm) thick steel sheet metal, as shown in FIG. 2. Triangular cutouts may form the truss construction of the support frame 103, to reduce a weight of the support frame 103 while maintaining sufficient strength. The support frame 103 may include a number of mounting holes 148 for assembling the support frame 103 and/or for connecting cross-bracing members for additional stability, if desired.

Figure 3:
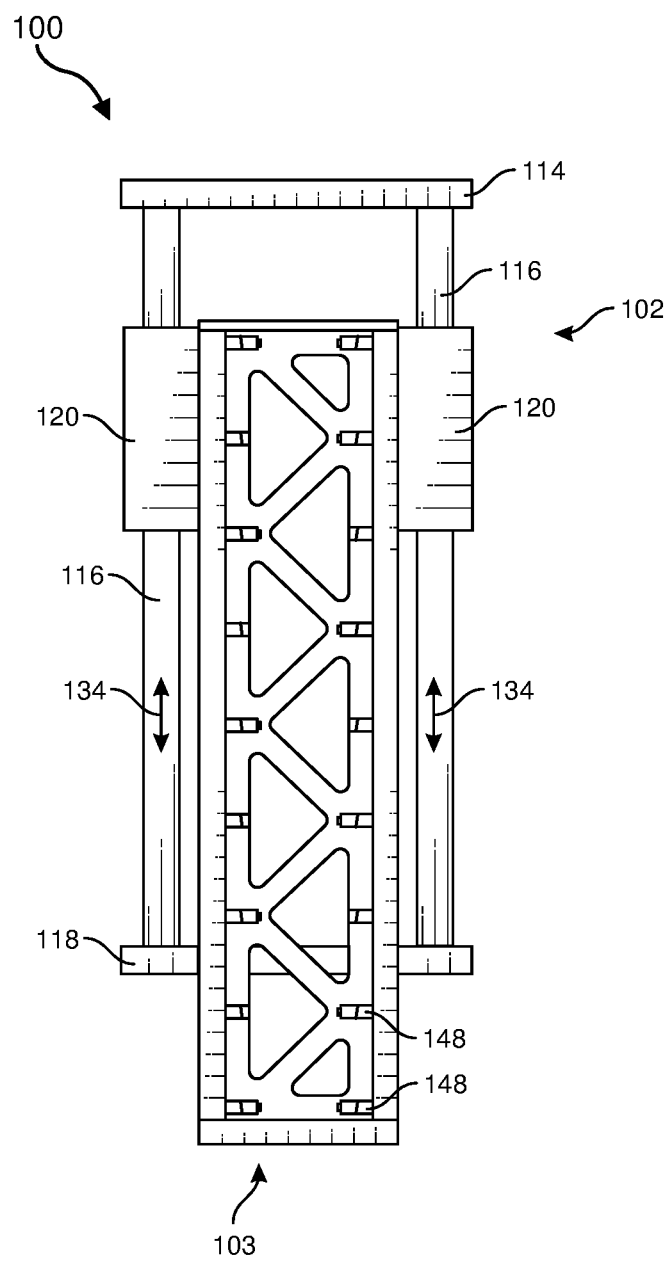
FIG. 3 is a side view of a support frame of the friction bit joining assembly of FIGS. 1 and 2, according to at least one embodiment of the present disclosure.

FIG. 3 illustrates the support frame 103 when viewed from the right of FIG. 2. Some components of the FBJ system 100 and FBJ assembly 102 are removed in the view of FIG. 3 for clarity. As shown in FIG. 3, in some examples the support frame 103 may include multiple structural elements (e.g., sheet metal elements) assembled together. At least some of the mounting holes 148 may be used for bolting or otherwise securing the structural elements of the support frame 103 to each other. The slideways 120 may be rigidly coupled (e.g., bolted and/or welded) to the support frame 103. The guiderails 116 may be slidably coupled to the support frame 103 via the slideways 120, to enable movement of the motor support element 114 and bit support element 118 in the axial direction 134 relative to the support frame 103.

Figure 4:
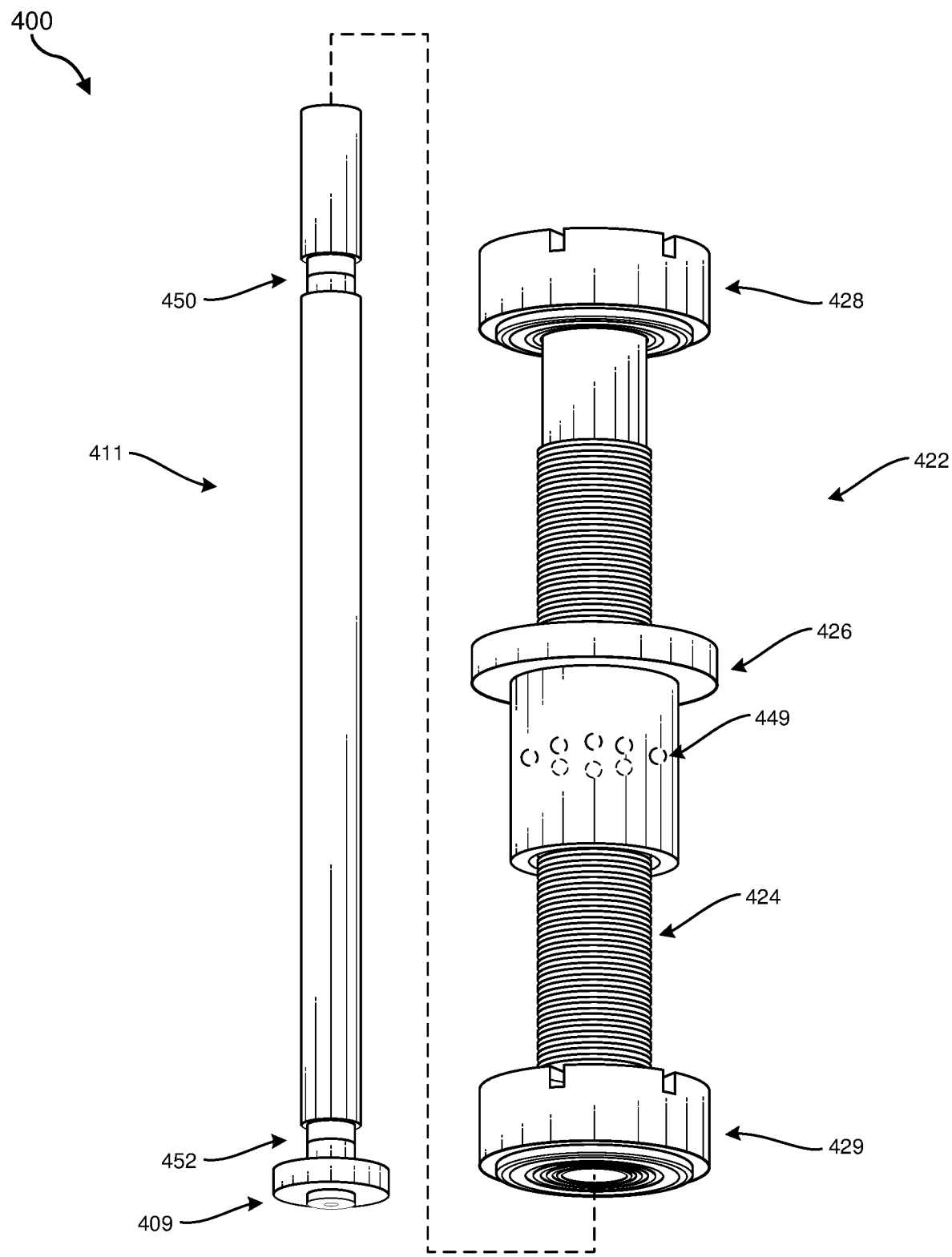
FIG. 4 is an exploded perspective view of a spindle assembly of a friction bit joining system, according to at least one embodiment of the present disclosure.

FIG. 4 is an exploded perspective view of a spindle assembly 400 of an FBJ system. For example, the spindle assembly 400 may be used in the FBJ system 100 described above. The spindle assembly 400 may include a chuck 409 for holding an FBJ bit, a spindle 411 rigidly coupled to the chuck 409, and a ball screw assembly 422. The ball screw assembly 422 may include a ball screw 424 and a ball screw holder 426. Ball bearings 449 may be positioned between external threads of the ball screw 424 and internal threads of the ball screw holder 426. An upper chuck support bearing 428 and a lower chuck support bearing 429 may be respectively positioned at an upper end and lower end of the ball screw 424.

When the spindle assembly 400 is assembled, the spindle 411 may be positioned within an interior cavity of the ball screw 424. An upper shoulder 450 of the spindle 411 may be positioned to be within the upper chuck support bearing 428. One or more bearing elements (e.g., ball bearings) may be positioned between the spindle 411 and the upper chuck support bearing 428 at the upper shoulder 450 to rotatably couple the spindle 411 within the ball screw 424 and to maintain an axial position of the spindle 411 relative to the ball screw 424. Similarly, a lower shoulder 452 of the spindle 411 may be positioned to be within the lower chuck support bearing 429. One or more bearing elements (e.g., ball bearings) may be positioned between the spindle 411 and the lower chuck support bearing 429 at the lower shoulder 452 to rotatably couple the spindle 411 within the ball screw 424 and to maintain the axial position of the spindle 411 relative to the ball screw 424. In addition, by rotatably coupling the spindle 411 at the upper chuck support bearing 428 and at the lower chuck support bearing 429, concentricity of the spindle 411 and the ball screw 424 may be substantially maintained even when lateral forces are applied to an FBJ bit held by the chuck 409.

Figure 5:
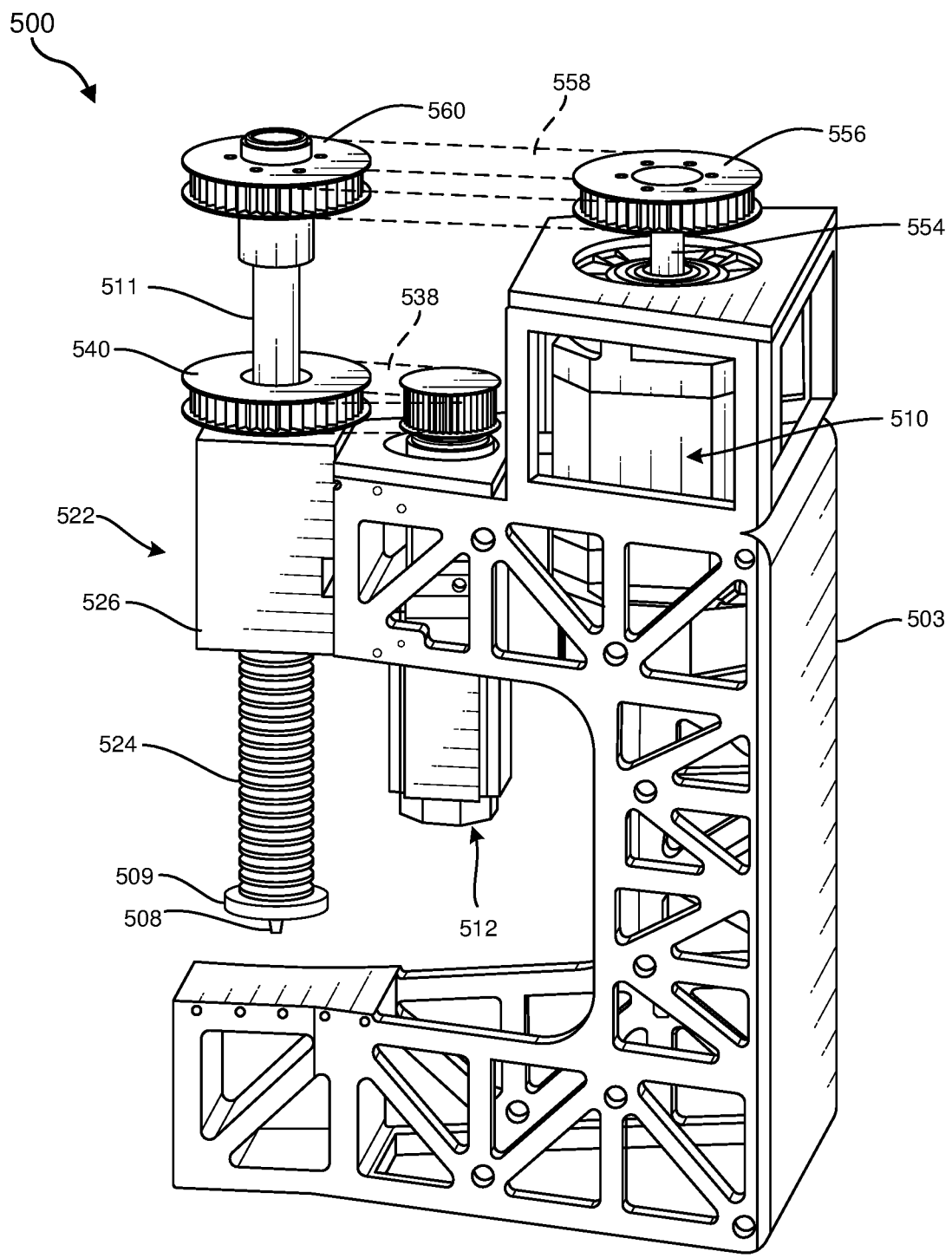
FIG. 5 is a side perspective view of a friction bit joining system, according to at least one other embodiment of the present disclosure.

FIG. 5 is a side perspective view of an FBJ system 500, according to at least one other embodiment of the present disclosure. The FBJ system 500 may be similar to the FBJ system 100 described above in some respects. For example, the FBJ system 500 may include a support frame 503, a chuck 509 for supporting an FBJ bit 508, a chuck spindle motor 510 for rotating the chuck 509 and FBJ bit 508, and a chuck driver motor 512 for axially driving the chuck 509 and FBJ bit 508. The chuck 509 may be mounted on a spindle 511. A ball screw assembly 522 may be positioned substantially concentrically around the spindle 511. The ball screw assembly 522 may be configured to axially move the spindle 511, chuck 509, and FBJ bit 508. For example, the ball screw assembly 522 may include a ball screw 524 and a ball screw holder 526.

In the example shown in FIG. 5, the chuck spindle motor 510 and the chuck driver motor 512 may be mounted on the support frame 503 laterally adjacent to the spindle 511 and chuck 509. For example, an output shaft 554 of the chuck spindle motor 510 may be operably coupled to the spindle 511 via a spindle motor gear 556 mounted to the output shaft 554, a spindle belt 558 (shown in dashed lines in FIG. 5), and a spindle gear 560 mounted to the spindle 511. In some embodiments, the spindle 511 may be axially slidable within the spindle gear 560. Similarly, the chuck driver motor 512 may be operably coupled to the ball screw 524 via a chuck driver belt 538 (shown in dashed lines in FIG. 5) and a drive gear 540.

By mounting the chuck spindle motor 510 and the chuck driver motor 512 to the support frame 503, the FBJ system 500 of FIG. 5 may be somewhat more compact and space-efficient compared to the FBJ system 100 described above with reference to FIGS. 1-3.

Figure 6A:
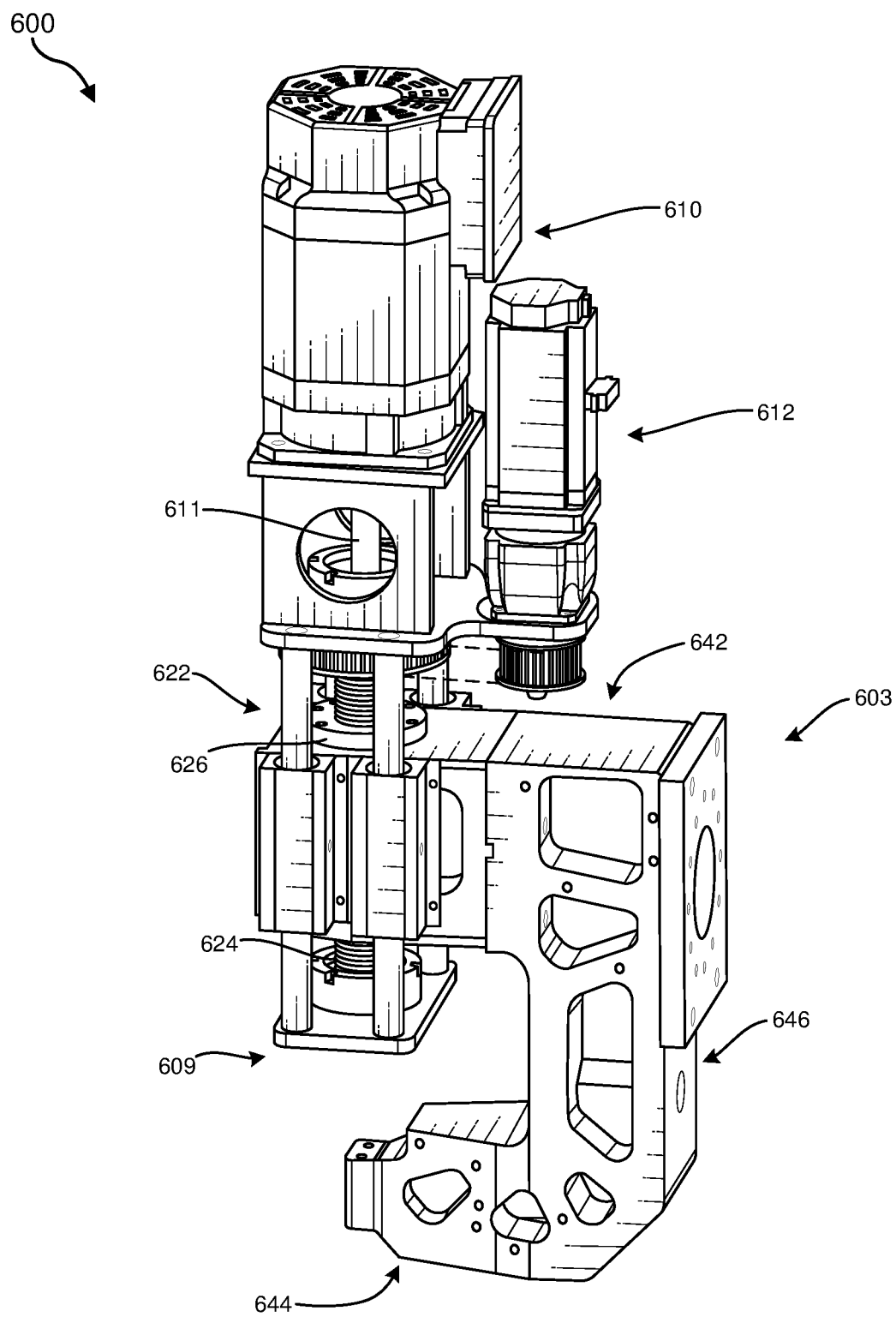
FIGS. 6A and 6B are respectively back perspective and front perspective views of a friction bit joining system, according to at least one additional embodiment of the present disclosure.
Figure 6B:
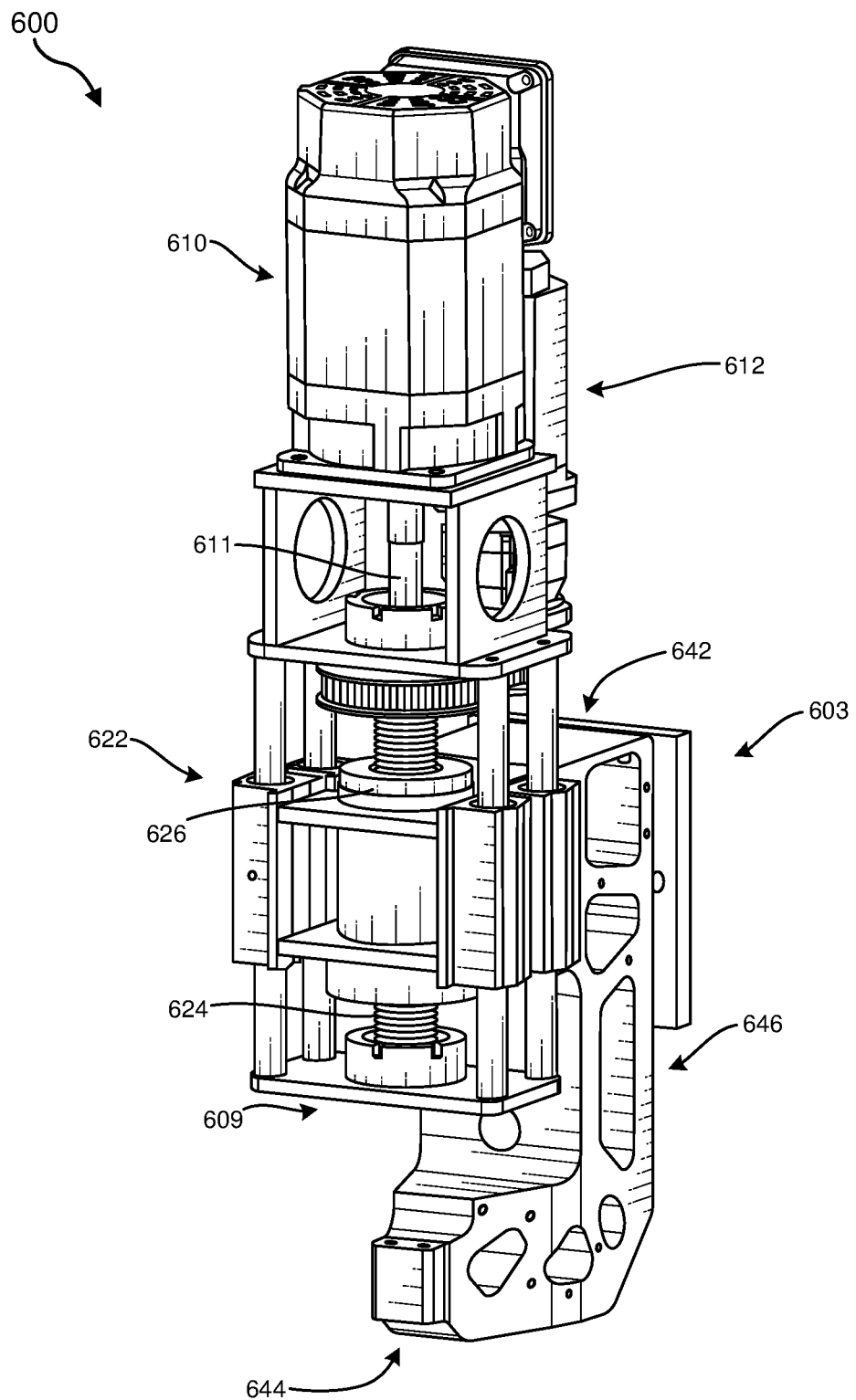

FIG. 6A is a front perspective view and FIG. 6B is a back perspective view of an FBJ system 600, according to at least one additional embodiment of the present disclosure. The FBJ system 600 may be similar to the FBJ systems 100, 500 described above. For example, the FBJ system 600 shown in FIGS. 6A and 6B may include a support frame 603, a chuck 609 for supporting an FBJ bit, a chuck spindle motor 610 for rotating the chuck 609 and FBJ bit, and a chuck driver motor 612 for axially driving the chuck 609 and FBJ bit. The chuck 609 may be mounted on a spindle 611. A ball screw assembly 622 may be positioned substantially concentrically around the spindle 611. The ball screw assembly 622 may be configured to axially move the spindle 611, chuck 609, and FBJ bit. For example, the ball screw assembly 622 may include a ball screw 624 and a ball screw holder 626.

The support frame 603 may have a generally C-shaped configuration. Thus, the support frame 603 may include a first end (e.g., upper) region 642, a second end (e.g., lower) region 644, and an intermediate region 646 extending from the first end region 642 to the second end region 644. In the example shown in FIGS. 6A and 6B, the second end region 644 and the intermediate region 646 may be formed from an integral, unitary material. For example, a single metal block may be formed (e.g., machined, molded, forged) into the second end region 644 and the intermediate region 646 of the support frame 603. In some examples, at least portions of each of the first end region 642, the second end region 644, and the intermediate region 646 may be formed from an integral, unitary material. By forming at least two of the regions of the support frame 603 from an integral, unitary material, the support frame 603 may exhibit increased mechanical strength compared to a support frame assembled from multiple pieces.

FIG. 7 is a flow diagram illustrating a method 700 of fabricating an FBJ system. In operation 710, a chuck driver motor may be operably coupled to a ball screw, such that the chuck driver motor may be configured to rotate the ball screw. Operation 710 may be performed in a variety of ways. For example, the chuck driver motor may be indirectly coupled to the ball screw, such as via a belt, as described above with reference to FIG. 2. Alternatively, the chuck driver motor may be coupled to the ball screw in other ways sufficient to enable the chuck driver motor to rotate the ball screw as desired.

In operation 720, the chuck driver motor may be mounted on a motor support element. Operation 720 may be performed in a variety of ways. For example, the chuck driver motor may be bolted and/or welded to the motor support element.

In operation 730, at least a portion of a spindle may be positioned within an internal bore of the ball screw. The spindle may be configured for holding an FBJ bit. Operation 730 may be performed in a variety of ways. For example, a portion of the spindle holding a chuck may be positioned within the internal bore. When assembled, an axis of rotation of the chuck and an axis of rotation of the ball screw may, in some embodiments, be substantially collinear.

In operation 740, the spindle may be rotatably coupled and axially fixed relative to the ball screw. Operation 740 may be performed in a variety of ways. For example, chuck support bearings may be used to couple the spindle to the ball screw in a manner that allows for relative rotation between the spindle and the ball screw, while axially fixing the chuck held by the spindle relative to the ball screw, as described above and shown in FIG. 2. Alternatively, the spindle may be rotatably coupled and axially fixed relative to the ball screw in other ways that enable the spindle to axially move upon axial movement of the ball screw, while also enabling rotation of the spindle relative to (e.g., within) the ball screw.

In operation 750, external threads of the ball screw may be mated with internal threads of a ball screw holder. Operation 750 may be performed in a variety of ways. For example, ball bearings may be positioned between the external threads of the ball screw and the internal threads of the ball screw holder, as discussed above with reference to FIG. 2. Additionally or alternatively, a lubricant may be applied between the external threads of the ball screw and the internal threads of the ball screw holder.

In operation 760, the ball screw, spindle, and friction bit joining bit may be slidably coupled to the support frame. Operation 760 may be performed in a variety of ways. For example, the listed components may be secured to one or more (e.g., four) guiderails, which may be slidably coupled to one or more (e.g., four) respective slideways. The slideway(s) may be rigidly coupled to the support frame, as described above with reference to FIGS. 1-3.

In some embodiments, the method 700 may also include operably coupling a chuck spindle motor to the spindle to rotate the chuck upon activation of the chuck spindle motor. The chuck spindle motor may be mounted on the motor support element.

FIG. 8 is a flow diagram illustrating a method 800 of joining two workpieces to each other. In operation 810, a chuck may be rotated with a chuck spindle motor to rotate an FBJ bit held by the chuck. At least a portion of a spindle coupled to the chuck may be positioned within an internal bore of a ball screw. The chuck may be in a fixed axial position relative to the ball screw. The chuck may also be rotatable relative to the ball screw. Operation 810 may be performed in a variety of ways. For example, the spindle and chuck may be positioned relative to the ball screw and rotated as discussed above with reference to FIG. 2, for example.

In operation 820, the chuck and friction bit joining bit may be driven toward overlapping workpieces to be joined to each other by rotating the ball screw with a chuck driver motor. Operation 820 may be performed in a variety of ways. For example, the chuck and friction bit joining bit may be axially driven as described above with reference to FIGS. 1-3, such as with a belt.

In operation 830, the rotating friction bit joining bit may be further axially driven into at least one of the overlapping workpieces to join the workpieces to each other by further rotating the ball screw with the chuck driver motor. Operation 830 may be performed in a variety of ways. For example, the workpieces may be joined as described above.

Accordingly, the FBJ systems and methods of the present disclosure may enable efficient, cost-effective, and functional solutions for friction bit joining two workpieces together. The disclosed configurations may enable friction bit joining capabilities at a cost that may be significantly less than typical standalone FBJ machines. Additionally, the disclosed concepts may provide additional stability and strength to FBJ systems for improved joining techniques. Accordingly, the concepts of the present disclosure may improve several aspects of friction bit joining techniques.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A friction bit joining system, comprising:
a ball screw having an internal bore through the ball screw and external threads;
a chuck and spindle configured to be rotated by a chuck spindle motor, wherein a portion of the spindle is positioned within the internal bore of the ball screw, the chuck is in a fixed axial position relative to the ball screw, the chuck is configured for holding a bit, and the chuck is rotatable relative to the ball screw;
a support frame supporting the ball screw, the chuck, the spindle, and the bit;
guiderails slidably coupled to the support frame and positioned substantially symmetrically about the ball screw;
a bit support element rigidly coupled to an end portion of the guiderails; and
a chuck driver motor positioned and configured to rotate the ball screw to axially move the chuck and the bit relative to the support frame.

2. The friction bit joining system of claim 1, wherein the support frame has a C-shaped configuration comprising:
a first end region supporting the ball screw, the chuck, the spindle, and the bit;
a second end region for providing a stop against which workpieces are held when the workpieces are being joined to each other with the bit; and
an intermediate region extending from the first end region to the second end region.

3. The friction bit joining system of claim 2, wherein at least the second end region and the intermediate region comprise an integral, unitary material.

4. The friction bit joining system of claim 1, further comprising:
a motor support element rigidly coupled to another, opposite end portion of guiderails.

5. The friction bit joining system of claim 1, wherein the guiderails comprise four guiderails positioned substantially symmetrically about the ball screw.

6. The friction bit joining system of claim 1, further comprising slideways that are rigidly coupled to the support frame and that slidably couple the corresponding guiderails to the support frame.

7. The friction bit joining system of claim 4, wherein the chuck spindle motor is supported by the motor support element.

8. The friction bit joining system of claim 4, wherein the chuck driver motor is supported by the motor support element.

9. The friction bit joining system of claim 1, wherein the support frame comprises a ball screw holder having internal threads complementary to the external threads of the ball screw.

10. The friction bit joining system of claim 9, further comprising ball bearings positioned between the external threads of the ball screw and the internal threads of the ball screw holder.

11. The friction bit joining system of claim 1, wherein the spindle is rotatably coupled to the ball screw via a first chuck support bearing at a first end portion of the ball screw and a second chuck support bearing at a second, opposite end portion of the ball screw.

12. The friction bit joining system of claim 1, wherein the chuck spindle motor is mounted to the support frame and an output shaft of the chuck spindle motor is operably coupled to the spindle via a spindle belt.

13. The friction bit joining system of claim 1, wherein the chuck driver motor is mounted to the support frame and an output shaft of the chuck driver motor is operably coupled to the ball screw via a chuck driver belt.

14. The friction bit joining system of claim 1, wherein the bit comprises a friction bit joining bit.

15. A method of fabricating a friction bit joining system, the method comprising:
positioning a portion of a chuck and spindle for holding a friction bit joining bit within an internal bore through a ball screw such that the chuck is in a fixed axial position relative to the ball screw and the chuck is rotatable relative to the ball screw;
operably coupling a chuck spindle motor to the chuck and spindle to rotate the chuck and spindle upon activation of the chuck spindle motor;
operably coupling a chuck driver motor to the ball screw to rotate the ball screw upon activation of the chuck driver motor to axially move the chuck and bit relative to a support frame;
mounting the chuck driver motor on a motor support element;
rotatably coupling and axially fixing the spindle relative to the ball screw;
mating external threads of the ball screw with internal threads of a ball screw holder of the support frame;
slidably coupling the ball screw, chuck, spindle, and bit to the support frame to support the ball screw, chuck, spindle, and bit with the support frame via guiderails slidably coupled to the support frame and positioned substantially symmetrically about the ball screw; and
rigidly coupling a bit support element to an end portion of the guiderails.

16. The method of claim 15, further comprising positioning ball bearings between the external threads of the ball screw and the internal threads of the ball screw holder.

17. The method of claim 15, mounting the chuck driver motor to another, opposite end portion of the guiderails.

18. The method of claim 15, wherein the guiderails comprise four guiderails.

19. The method of claim 15, further comprising:
mounting the chuck spindle motor on the motor support element.

* * * * *